United States Patent
Der Stepanian et al.

(10) Patent No.: US 7,141,225 B1
(45) Date of Patent: Nov. 28, 2006

(54) METHOD FOR ELIMINATING HEAVY METALS CONTAINED IN SLUDGE

(76) Inventors: Manouk Der Stepanian, 16, Bellevoie, CH - 2800, Delémont (CH); Christian Assoun, c/Neutral Metal S.A., 14, rue du Rhône, CH-1204, Geneva (CH)

( * ) Notice: Subject to any disclaimer, the term of this patent is extended or adjusted under 35 U.S.C. 154(b) by 667 days.

(21) Appl. No.: 10/311,611

(22) PCT Filed: Jun. 21, 2000

(86) PCT No.: PCT/IB00/00820

§ 371 (c)(1),
(2), (4) Date: Dec. 17, 2002

(87) PCT Pub. No.: WO01/98217

PCT Pub. Date: Dec. 27, 2001

(51) Int. Cl.
*B01D 11/00* (2006.01)
(52) U.S. Cl. .................................... 423/150.1
(58) Field of Classification Search ............... 423/139, 423/140, 144, 145, 146, 147, 150.1, 153, 423/558, 560, 561.1
See application file for complete search history.

(56) References Cited

U.S. PATENT DOCUMENTS

| 4,260,491 A | 4/1981 | Cassidy et al. |
| 4,428,840 A | 1/1984 | Mudder et al. |
| 5,665,324 A | 9/1997 | Izawa et al. |

FOREIGN PATENT DOCUMENTS

EP    0 773 192 A1    5/1997

*Primary Examiner*—Edward M. Johnson
(74) *Attorney, Agent, or Firm*—McGlew & Tuttle,

(57) ABSTRACT

A method for purifying sludge suspected of containing heavy, toxic and/or precious metals in order to extract them, the sludge being suspended in an aqueous solution and together forming a mass to be treated. $FeCl_3$ is mixed with the mass, until an acidic pH of the solution is obtained. $(CO_2H)_2$ and $NH_4Cl$ are then mixed with the mass until metal pro-chelates are formed. Mixed alkali sulfides are then mixed with the mass until a solution with a very basic pH is obtained, to form colloidal complex iron chelates, which trap the metals. The solution is neutralized by adding an acid, until alkaline-ferrous sulfides and hydroxides containing the metals are precipitated. The mass is then centrifuged to form from the mass a liquid phase and a solid phase, the solid phase containing the alkaline-ferrous sulfides.

14 Claims, 3 Drawing Sheets

METHOD FOR ELIMINATING HEAVY METALS CONTAINED IN SLUDGE

FIELD AND BACKGROUND OF THE INVENTION

The present invention relates to a physico-chemical method for eliminating heavy, toxic and/or precious metals contained in urban, industrial sludge and liquid animal manure. It concerns more particularly sludge in which the metals are suspended in an aqueous solution and together form a mass to be treated. Elimination of such sludge raises serious problems, since certain metal oxides can be seriously detrimental to both human and animal health.

SUMMARY OF THE INVENTION

The object of the present invention is to propose such a method which is particularly efficient and of moderate cost.

According to the invention, the method is characterised in that it includes the following steps:

mixing $FeCl_3$ with the mass, until an acidic pH of the solution is obtained, mixing $(CO_2H)_2$ and $NH_4Cl$ with the mass until metal pro-chelates are formed, mixing mixed alkali sulfides with the mass until a solution with a very basic pH is obtained, to form colloidal complex iron chelates, which trap said metals, neutralising the solution by adding an acid, until alkaline-ferrous sulfides and hydroxides containing said metals are precipitated, forming by centrifuging, from the mass, a liquid phase and a solid phase, said solid phase containing said alkaline-ferrous sulfides.

This method has proved particularly interesting when the mixed alkali sulphide is made from the following steps:

mixing NaOH and KOH in substantially equal quantities in the form of anhydrous granules, adding flowers of sulphur to the mixture, in a proportion comprised between 5 and 10% by weight, mixing until the sulphur adheres to the granules, adding water to the mixture in a proportion comprised between 3 and 20% until an exothermic reaction is obtained and the granules are dissolved, thus forming a liquid.

Advantageously, the mixture obtained is dissolved in 1 to 3 times its volume of water.

For the method to be carried out in the best possible conditions, the mass has to be homogenous. This is why the steps of mixing the mass are carried out with simultaneous application of ultrasounds.

Separation of the water and solid residue occurs efficiently and economically by centrifuging by means of a centrifugal separator and settling tank.

It goes without saying that the solid phase, which contains the metals, has to be treated with the greatest care, since certain ones of them have a high level of toxicity. One solution consists in storing this solid phase in particular conditions, preventing any pollution. Another solution, solving the problem more ecologically and efficiently, consists in separating the metals from the solid phase. Thus, the latter is introduced in powder form, into a plasma reactor, in the presence of a gas chosen from among nitrogen and argon, to eliminate the organic compounds and reduce the metals contained in the solid phase.

It may happen that the liquid phase resulting from centrifugation still contains a few metal ions, particularly precious metal ions. In order to remove all the metals from the sludge, $NH_4OH$ is added to the liquid phase to form metal hydroxides from the metal chlorides still comprised in this phase. The hydroxides are then removed by centrifuging.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
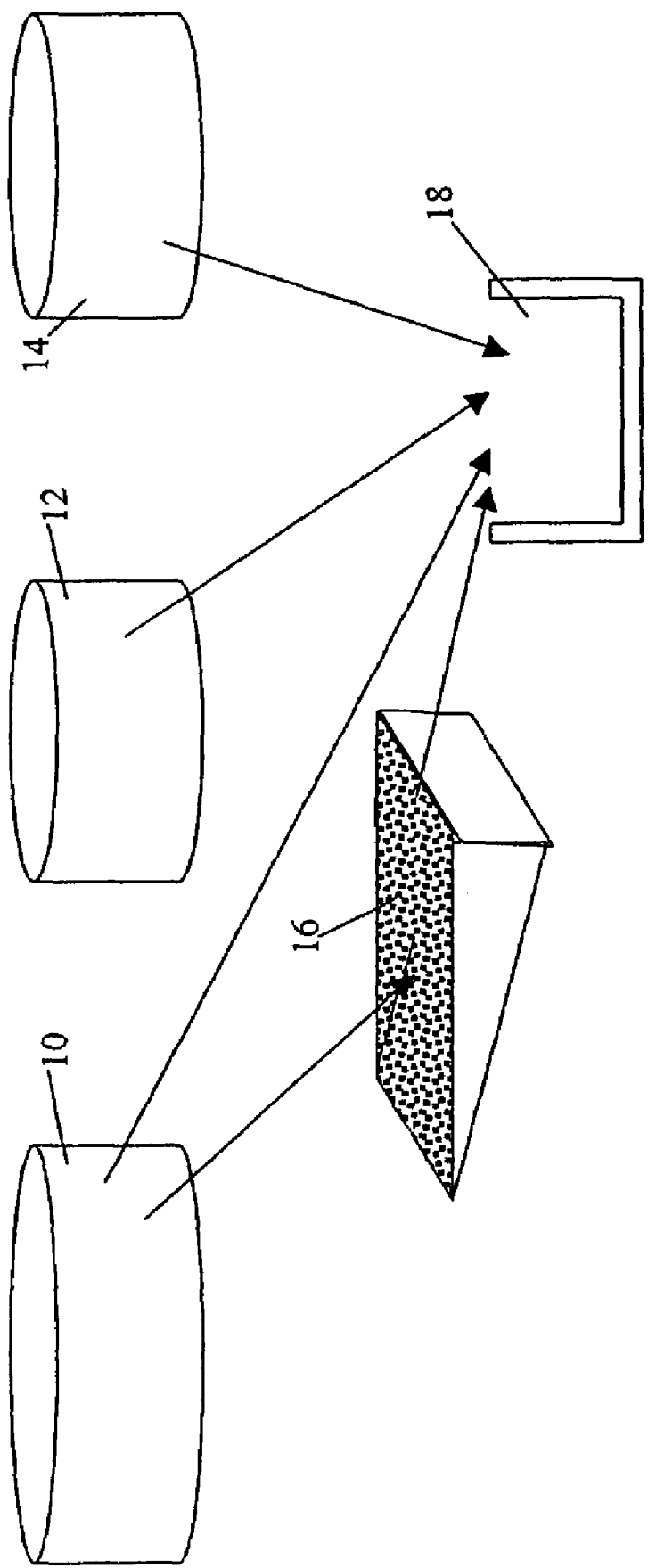
FIG. 1 is a schematic view showing different steps according to the invention.

Referring to the drawings in particular, the sludge intended to be processed by the method according to the invention can originate either from a sedimentation tank for treating waste water, shown at 10, a factory 12 or an agricultural drain 14. This sludge may or may not be stored in a tank 16.

The method according to the invention requires implementation of two ultrasound tanks 18 and 20, two mixers 22 and 24, a centrifugal separator and settling tank 26, a collecting vessel 27, a grinder 28 and a plasma reactor 30. It is also necessary to know the concentrations of the different metals contained in the sludge, in order to choose and dose the reagents. For this purpose, mass spectrometry and/or chromatography techniques are used, the apparatus used for this purpose being schematically shown at 32.

Plasma reactor 30 includes a pump 34 and several chambers, namely a primary and secondary plasma homogenising chamber 38 and a main chamber 40 for the actual heat treatment.

In the following description, the sludge volumes concerned are of the order of one to several cubic meters. It is, of course, clear, that the quantities treated may vary within considerable limits without this raising any problems, the stated principles remaining essentially the same.

The sludge to be treated begins by being subjected to analysis, by means of installation 32, in order to discover its essential composition, and more particularly the presence of dangerous materials, particularly metal or organic materials. Knowledge of the sludge composition enables planning of the manner in which it will be treated during the process.

As shown in FIG. 1, the sludge is, first of all, introduced into tank 18, and subjected to ultrasound vibrations, so as to homogenise the mass that it forms. If necessary, water will be added to this mass, in order to obtain, in a reasonable time period that is of the order of 10 to 60 minutes, a mass formed of sludge micro-particles suspended in water.

Figure 2:
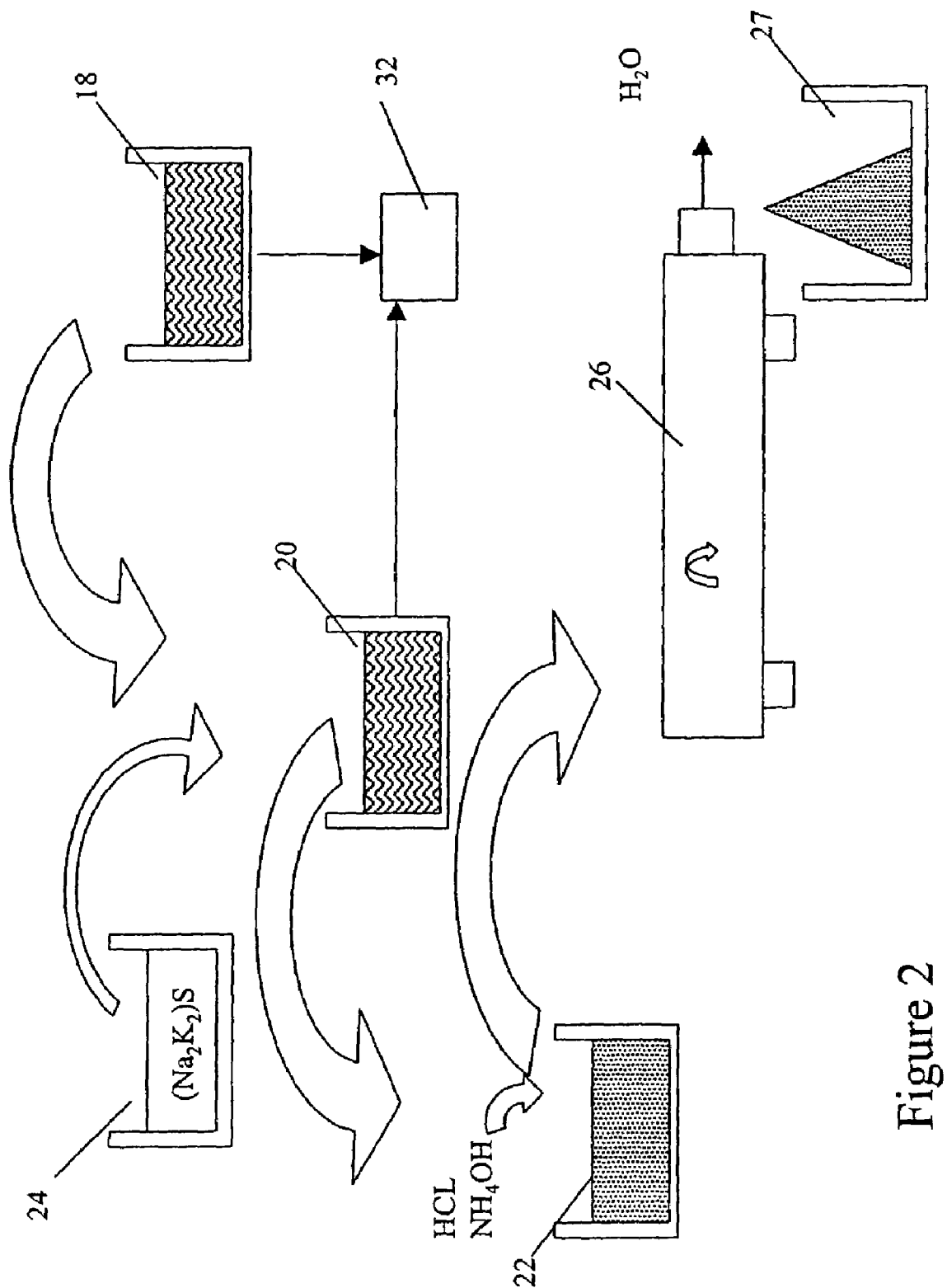
FIG. 2 is a schematic view showing features of operations according to the method of the invention.

During this operation, shown in FIG. 2, the acidity of the mass is adjusted by adding $FeCl_3$, until a pH comprised between approximately 4.5 and 6.7 is obtained, while checking that the temperature of the mass does not exceed 60° C. Typically, the quantity of $FeCl_3$ added is substantially equal to one third of the initial sludge volume.

When the mass is homogenous, it is completed with approximately 2% by volume of $NH_4Cl$ and 2% by volume of $(CO2H)_2$. This addition has the effect of forming heavy and/or precious metal pro-chelates, because of the acidic pH of the mass.

The mass thereby obtained is transferred into second tank 20, to which 10 to 30% by volume of mixed alkali sulfides is added, obtained by a method that will be explained hereinafter. This addition has the effect of forming colloidal complex iron chelates, which trap the heavy metals as well as metals easily complexed by sulphur. Moreover, the pH of the mass becomes very basic, reaching a value comprised between 11 and 12. This operation lasts approximately 20 to 30 minutes.

When the latter is finished, the mass is treated with a low concentration HCl solution (5 to 10 mol/l), until the alkaline-ferrous sulfides and hydroxides co-precipitate. The correct dose of HCl corresponds to an excess of 5 to 7%. In order to attain the desired precision, the pH is monitored, automatically, by means of equipment well known to those skilled in the art. Practice has shown that, if the sludge is rich in precious metals, it may be advantageous to add a small quantity of $NH_4Cl$, $(CO_2H)_2$ and/or glucose to the hydrochloric acid.

This precipitation of the sulfides and hydroxides has the effect of removing from the solution most of the metals that it initially contains.

The mass is then centrifuged or transferred into settling tank 26 of the type comprising an endless screw device to separate it into two phases, one liquid and the other solid.

The liquid, slightly acidic phase, is an almost clean water, able to be used for the current use, for example for diluting the sludge at the beginning of the process. In certain cases, it may happen that the liquid solution still contains precious metals. It is then possible to treat it by adding $NH_4OH$ which reacts with the metal chlorides to form hydroxides, which precipitate and which can then be removed by centrifugation.

Figure 3:
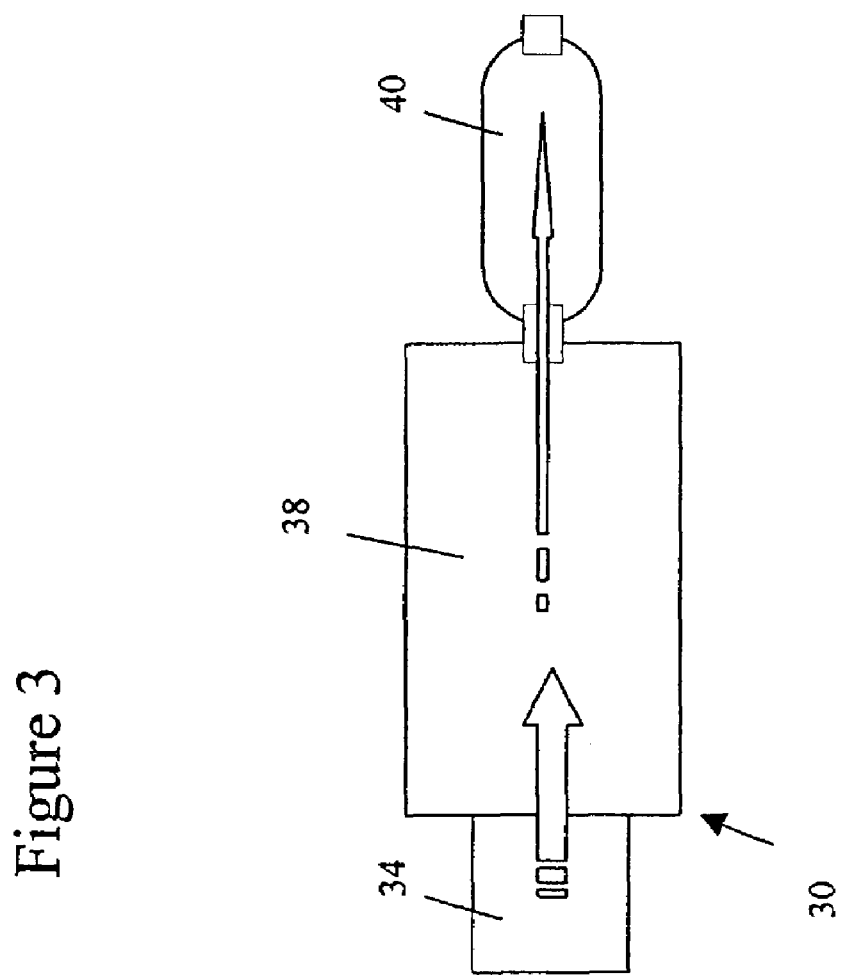
FIG. 3 is a schematic view showing treatment according to the method of the invention.
Figure 3:
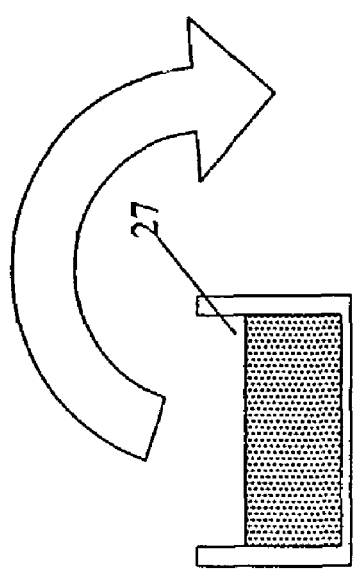

Advantageously, and as shown in FIG. 3, the solid mass can then be treated in a plasma reactor like that shown schematically at 30, either of the resistive or RF inductive type (radiofrequency and microwaves).

The solid phase is introduced into reactor 30 by pump 34, after having been pulverised and dried by means of grinder 28. The powder thus obtained is introduced into chamber 38 and driven by a gas flow, chosen from argon and nitrogen. This operation allows homogenisation to be ensured. The flow is then driven into main chamber 40, in which the temperature is typically comprised between 6000 and 8000° C. At this temperature, the organic compounds are totally decomposed. The heat treatment thereby realised also allows the metals contained in the solid phase to be reduced.

It goes without saying that the gases leaving the plasma reactor have to be subjected to filtering, in order to avoid emission of SO2 or CO for example. For this purpose, KOH type traps can advantageously be used.

As explained hereinbefore, the alkaline mixed sulfides are prepared in a particular manner, by means of mixer 24, from sodic NaOH and potassic KOH bases in granules and usually between 5% and 10% by weight of flowers of sulphur, all three of technical grade, which are mixed for several minutes. Ultrasound may be incorporated to aid in the mixing of the components. When the sulphur adheres well to the granules, a few liters of water, usually between 3% and 20%, are added to the mixture. This reaction is highly exothermic. The entire mass is converted into a boiling black liquid, which is stirred until the reaction has finished. After ensuring that all the granules have dissolved and that the mass obtained has cooled to a temperature of approximately 80° C., 1 to 3 times its volume of running water is added. The mixed sulfides thereby obtained can be used during the process described hereinbefore.

In a variant that has not been shown, it is possible to extract the metals by chemical means. For this purpose, at the settling tank outlet, the solid phase is formed of a mixture of organic and non-organic materials, essentially hydroxides, which can, in a conventional manner, be extracted from organic compounds, using an acid bath.

For their part, the organic compounds can be used as agro-chemical additives.

While specific embodiments of the invention have been shown and described in detail to illustrate the application of the principles of the invention, it will be understood that the invention may be embodied otherwise without departing from such principles.

The invention claimed is:

1. A method for purifying sludge, suspected of containing metals in order to extract them, suspended in an aqueous solution and together forming a mass to be treated, the method comprising the steps of:

mixing $FeCl_3$ with the mass, until an acidic pH of the solution is obtained;

mixing $(CO_2H)_2$ and $NH_4Cl$ with the mass until metal pro-chelates are formed;

mixing alkali sulfides with the mass until a solution with a very basic pH is obtained, to form colloidal complex iron chelates, which trap said metals;

neutralizing the solution by adding an acid, until alkaline-ferrous sulfides and hydroxides containing said metals are precipitated; and forming by centrifuging, from the mass, a liquid phase and a solid phase, said solid phase containing said alkaline-ferrous sulfides.

2. A method according to claim 1, wherein said alkaline-sulphide is made from the following steps:

mixing NaOH and KOH in substantially equal quantities in the form of anhydrous granules;

adding flowers of sulphur to the mixture, in a proportion comprised between 5 and 10% by weight;

mixing until sulphur adheres to the granules; and adding water to the mixture in a proportion comprised between 3 and 20% until an exothermic reaction is obtained and the granules are dissolved.

3. A method according to claim 2, wherein the mixture obtained is dissolved in 1 to 3 times its volume of water.

4. A method according to claim 1, wherein the steps of mixing said mass are carried out in the presence of ultrasounds.

5. A method according to claim 1, wherein extraction by centrifuging is carried out by means of a centrifugal separator and settling tank.

6. A method according to claim 5, wherein said solid phase is then introduced in powder form into a plasma reactor, in the presence of nitrogen, to eliminate the organic compounds and reduce the metals contained in said phase.

7. A method according to claim 5, wherein $NH_4OH$ is added to said liquid phase to form metal hydroxides from the metal chlorides contained in said liquid phase, said hydroxides being then extracted by centrifugation.

8. A method according to claim 2, wherein the steps of mixing said mass are carried out in the presence of ultrasounds.

9. A method according to claim 3, wherein the steps of mixing said mass are carried out in the presence of ultrasounds.

10. A method according to claim 2, wherein extraction by centrifuging is carried out by means of a centrifugal separator and settling tank.

11. A method according to claim 3, wherein extraction by centrifuging is carried out by means of a centrifugal separator and settling tank.

12. A method according to claim 4, wherein extraction by centrifuging is carried out by means of a centrifugal separator and settling tank.

13. A method according to claim 6, wherein $NH_7OH$ is added to said liquid phase to form metal hydroxides from the metal chlorides contained in said liquid phase, said hydroxides being then extracted by centrifugation.

14. A method according to claim 5, wherein said solid phase is then introduced in powder form into a plasma reactor, in presence of argon, to eliminate the organic compound and reduce the metal contained in said phase.

* * * * *